United States Patent [19]
Soechting et al.

[11] Patent Number: 6,129,515
[45] Date of Patent: Oct. 10, 2000

[54] TURBINE AIRFOIL SUCTION AIDED FILM COOLING MEANS

[75] Inventors: Friedric O. Soechting, Tequesta; Thomas A. Auxier, Lake Park, both of Fla.

[73] Assignee: United Technologies Corporation

[21] Appl. No.: 07/979,718

[22] Filed: Nov. 20, 1992

[51] Int. Cl.⁷ ........................................ F01D 5/18
[52] U.S. Cl. ........................................ 416/97 R; 415/115
[58] Field of Search .................. 416/97 R, 97 A, 416/96 R, 96 A, 95, 90 R; 415/115, 912

[56] References Cited

U.S. PATENT DOCUMENTS 4,753,575  6/1988  Levengood et al. ................. 416/97 R
4,897,020  1/1990  Tonks ................................. 415/115

FOREIGN PATENT DOCUMENTS 2202907  10/1988  United Kingdom ................ 416/96 R

*Primary Examiner*—Harold J. Tudor
*Attorney, Agent, or Firm*—Norman Friedland

[57] ABSTRACT

Film cooling effectiveness for internally air cooled turbine blades of gas turbine engines is enhanced by including an interconnecting passage to the film cooling hole that is in communication with a lower internal pressure in the blade to create a suction at the exit end of the film hole to limit penetration into the gas stream.

5 Claims, 4 Drawing Sheets

TURBINE AIRFOIL SUCTION AIDED FILM COOLING MEANS

TECHNICAL FIELD

This invention relates to internally cooled airfoils of turbine blades for gas turbine engines and particularly to means for enhancing film cooling of the external surfaces of the blade.

BACKGROUND ART

As is well known, in order to maintain the structural integrity of the turbine blades of a gas turbine engine, it is necessary to keep the metal temperature below the extreme temperatures of the gas path. Various cooling techniques, such as impingement cooling, trip strips, pedestals, and the like are used to cool the airfoil section by flowing coolant air internally of the blade. The cooling air, which is at a higher temperature than it was initially, is still sufficiently cool to afford cooling of the external surface of the blade. To this end, the air is discharged through film cooling holes in the airfoil's exterior walls and is judiciously controlled to effectuate film cooling of the airfoil's exterior surface.

Ideally, the entire surface of the airfoil should be covered with a sheet of film cooling air while utilizing the least amount of cooling air as possible. Obviously, inefficient use of cooling air adversely affects engine operating performance. As is well known, this cooling air would otherwise be air that is part of the engine working fluid since energy is already put into the air by virtue of its being pressurized by the compressors of the engine. Since this air is extracted from the compressor and hence, is a loss to the gas path or engine's working medium, it bears a large influence in engine efficiency.

It is the goal of the turbine designer within the constraints of the limited amount of air allocated for turbine blade cooling to completely bathe the airfoil surface with a film of cooling air. This has met a modicum of success but still hasn't attained the ideal. Obviously, as engine requirements become more demanding the optimum use of cooling air presents a more challenging problem to the turbine blade designer.

Some examples showing attempts for attaining effective film cooling are disclosed in U.S. Pat. No. 4,676,719 granted to T. A. Auxier, a co-inventor of this patent application, on Jun. 30, 1987 and entitled "Film Coolant Passages for Cast Hollow Airfoils", and U.S. Pat. No. 4,738,588 granted to R. E. Field, on Apr. 19, 1988 and entitled "Film Cooling Passages with Step Diffuser", both patents being assigned to United Technologies Corporation, the assignee common with this patent application.

In one of these examples, the patent discloses a longitudinal slot that intersects the film coolant passage to meter the coolant flow. This serves to allow the designer to select the requisite area of the intersecting holes to regulate and control the amount of coolant being used for film cooling the entire blade. Obviously, since the turbine blade designer is allocated a given amount of air to be used for cooling purposes, by proper control of the metering means, the amount of cooling air in the film cooling passages is regulated and hence, is used effectively.

In the other example, the patent teaches the use of a step diffuser to attain wider diffusion angles of the discharging film cooling air in an attempt to spread the coolant as it leaves the film cooling passage as wide as possible. This serves to cover a wider area of the airfoil surface with a given number of film coolant air holes.

Obviously, one of the criteria for effective film cooling is to prevent the fluid discharging from the film coolant passages to penetrate beyond the boundary layer of the gases adjacent the exterior surface of the airfoil. Hence, in addition to all the other criteria the turbine blade designer must adhere to, he must take the necessary steps to assure that the cooling air penetration into the gas path or mainstream is minimized. For example, if the injected air penetrates beyond the boundary layer, the decay rate of the film will be accelerated due to increased mixing of the film cooling air and the hot mainstream gases. As a consequence the film cooling effectiveness is adversely affected.

Shaped holes, rather than round holes, as disclosed, for example, in U.S. Pat. Nos. 4,676,719 and 4,738,588, supra, and the diffused passage as disclosed in the above mentioned 4,738,588 patent are attempts to attain high levels of film cooling effectiveness. Notwithstanding the modicum of success these techniques have met, they still have shortcomings and are not the optimum for attaining film cooling effectiveness.

We have found that we can improve film cooling effectiveness for certain film cooling holes that are utilized in certain sections of the airfoil. For example, and not by way of limitations, the suction aided film cooling, as taught by this invention, is particularly efficacious when used on the suction side and the trailing edge of the airfoil.

DISCLOSURE OF THE INVENTION

An object of this invention is to provide improved film cooling effectiveness for film cooled holes of airfoils of turbine blades used in gas turbine engines.

A feature of this invention is to locate in the film cooled passage an additional passage communicating with a lower pressure for creating a suction for limiting the penetration of the coolant when injected into the gas path.

A feature of this invention is to generate suction means at the exit end of the film holes which means are characterized as being relatively inexpensive to fabricate without requiring complex modifications to existing types of internally cooled blades.

The foregoing and other features of the present invention will become more apparent from the following description and accompanying drawings.

BEST MODE FOR CARRYING OUT THE INVENTION

While this invention in its preferred embodiment is described as being utilized in the turbine blade of a gas turbine engine, it is to be understood that the invention can likewise be applied to static components of the engine, such as the stator vanes and the like.

Figure 1:
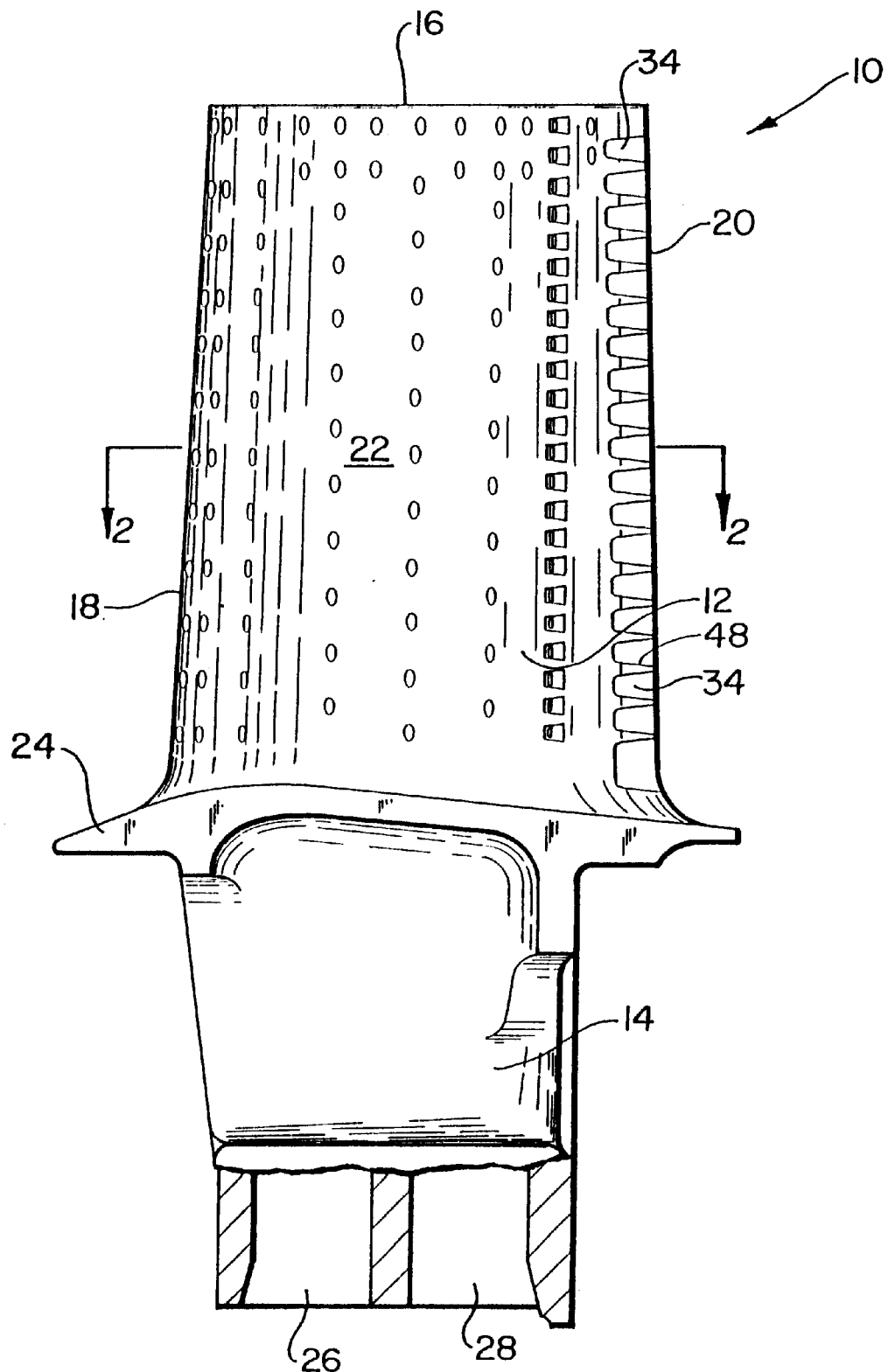
FIG. 1 is a view in elevation illustrating an axial flow air cooled turbine blade for a gas turbine engine.
Figure 2:
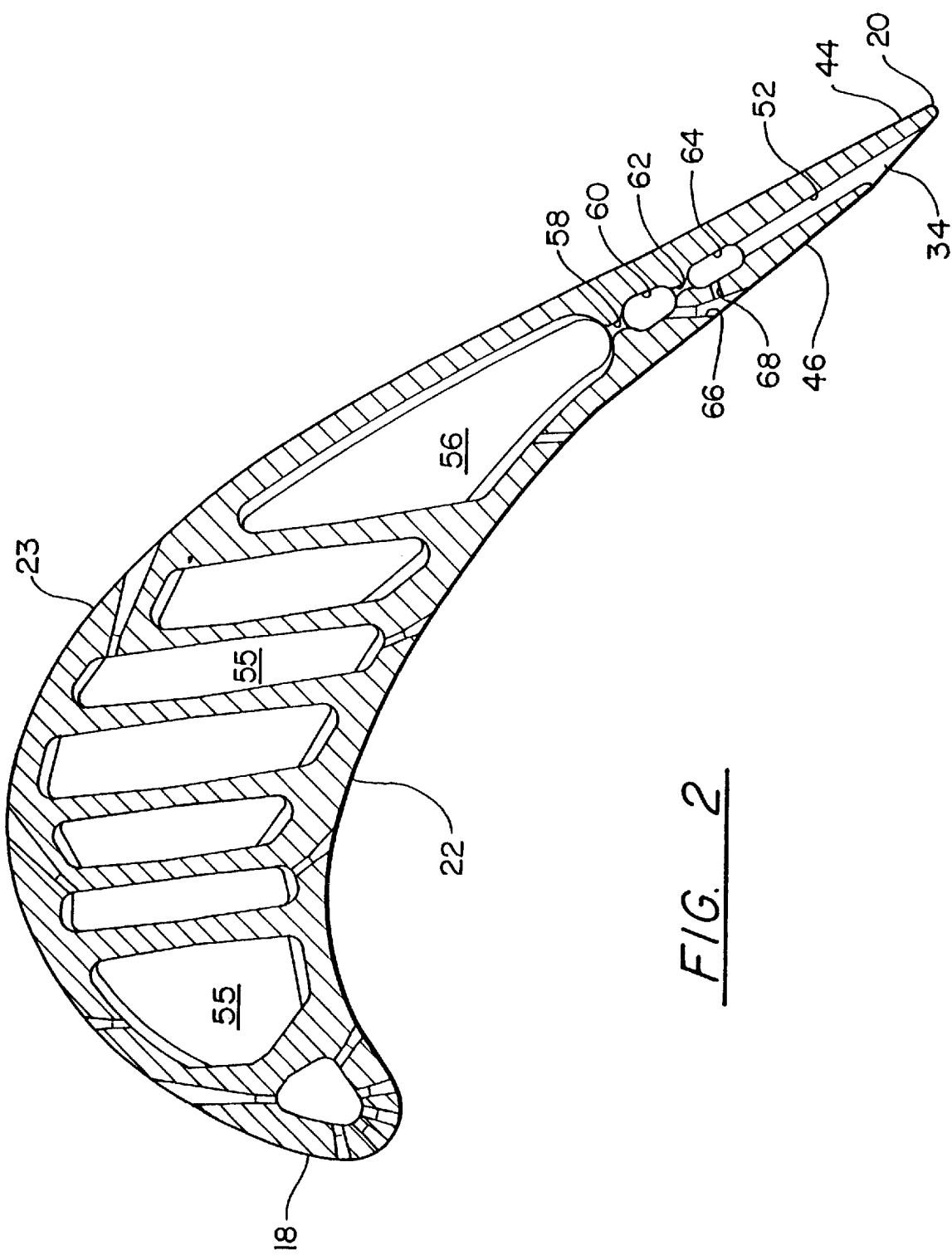
FIG. 2 is a sectional view taken along lines 2—2 of FIG. 1.

Reference is now made to FIG. 1 and FIG. 2 as an exemplary embodiment of the present invention which depicts a turbine blade generally illustrated by reference numeral 10, comprised of airfoil section 12, root section 14, tip section 16, leading edge 18, trailing edge 20 and platform 24. As oriented in FIG. 1, the surface of the airfoil in the drawing facing the viewer is the pressure side 22 which diametrically opposes the suction side 23 and, in a schematic fashion, illustrates the numerous film cooling holes in fluid communication with the internal passages that serve to bathe the surface of the pressure side wall with a film of coolant. Coolant is supplied through the root section 14 through internal passages 26 and 28 which is in fluid communication with the compressor section of the gas turbine engine (not shown). Further details of coolant flow for hollow turbine blades may be had by referring to U.S. Pat. Nos. 4,676,719 and 4,738,588, supra.

As is apparent from viewing FIG. 2, the blade in the radial direction is essentially divided into three sections, namely, the leading edge 18, the trailing edge 20 and the section intermediate thereof. Each section of the airfoil may incorporate varying cooling treatments. As for example, the leading edge employs a shower head arrangement of discharge coolant holes, the trailing edge may employ, along with film cooling, a wide discharge pocket 34 for discharging coolant from the blade and the section intermediate thereof may incorporate film cooling holes. In addition, internal cooling is effectuated by conduction and impingement and cooling enhancement may be achieved by use of trip strips, pedestals, ribs and the like.

For the sake of convenience and simplicity and inasmuch as this invention is applied in one of its preferred embodiments, to the trailing edge, the description to follow will omit the description of other sections of the airfoil and will be directed primarily this section of the turbine blade. Of course, as mentioned above and as will be described in more detail hereinbelow, the invention has application in other sections of the airfoil.

Figure 6:
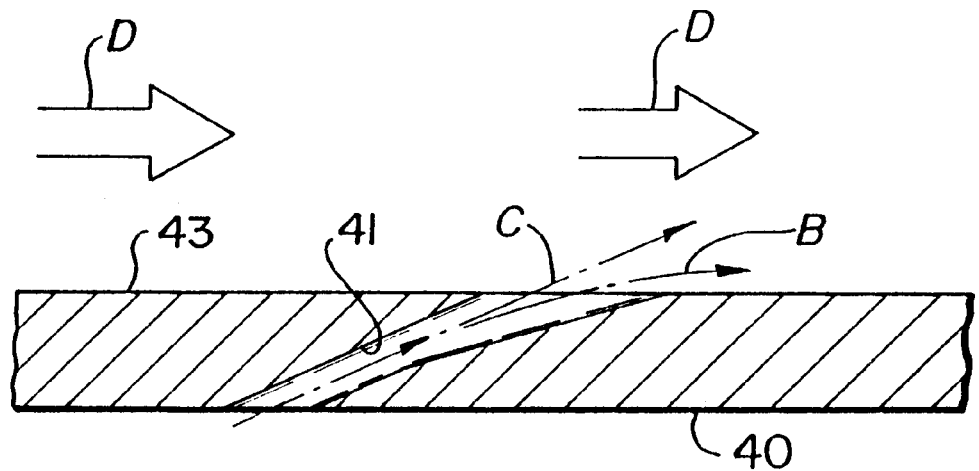
FIG. 6 is a partial view in section illustrating a typical prior art film cooling hole and, FIG. 7 is a fragmentary view partly in section and partly in schematic illustrating effectiveness of this invention.

Perhaps, a better understanding of this invention can be appreciated by reviewing the prior art. To this end reference is made to FIG. 6 which shows a portion of a typical airfoil wall 40 which can be either the pressure side or the suction side of a turbine blade. A typical film cooling hole 41, which in this instance is a shaped hole, extends from internally of the wall 40 to the external surface 43. Coolant is discharged into the gas path in the manner illustrated by arrows B and C. As is apparent from FIG. 6, a portion of the coolant air adheres to the surface 43 and forms the boundary layer as depicted by arrow B, while the remaining portion, as depicted by arrow C, penetrates through the boundary layer and flows directly into the gas path stream, as depicted by arrow D. As was mentioned earlier, because the latter mentioned portion of air doesn't make the turn along the boundary layer but rather penetrates the boundary layer, film effectiveness is significantly reduced and decay rate is accelerated.

Figure 3:
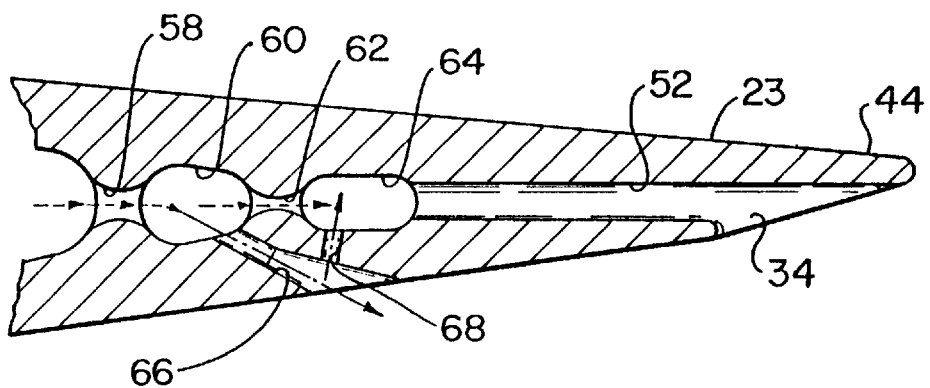
FIG. 3 is a partial view in section and an enlargement of the trailing edge of FIG. 2.

In accordance with this invention and as best seen in FIGS. 1, 2, and 3 the trailing edge is defined by the lower extremities of the suction side wall 23 and pressure side wall 22. As can be seen in FIG. 1 and FIG. 3 which is an enlarged view of the trailing edge section of FIG. 1, the lower extremity 46 of pressure side wall 22 carries a plurality of axially extending fingers 48 that extend to the extremity of and unites with the extremity 44 of suction side wall 23 and together define a cavity 34 each of which are in fluid communication with the internal passages 52 (one being shown). Since all the cavities and their spanwise connecting passage extending along the airfoil are identical, the description to follow will describe the flow path through one of these passages with the understanding that all the other flow paths through the other passages are identical. As noted in FIG. 1, cooling air from the compressor section of the engine (not shown) is admitted internally of the airfoil 12 through passages 26 and 28 which communicate with the internal interconnecting radial passages 55 extending from the root section to the tip section of the airfoil. A portion of the cooling air flows into radial passage 56 which is in fluid communication with axial passage 52 for leading air to the trailing edge. Flow from radial passage 56 is directed axially toward passage 52 by first flowing into passage 58, chamber 60, passage 62 and chamber 64. Since each of these flow passages are in serial relationship it is quite apparent that there is a progressive reduction in pressure in the downstream direction. Hence, it is apparent from the foregoing that the pressure in chamber 64 is lower than the pressure in chamber 60.

Figure 7:
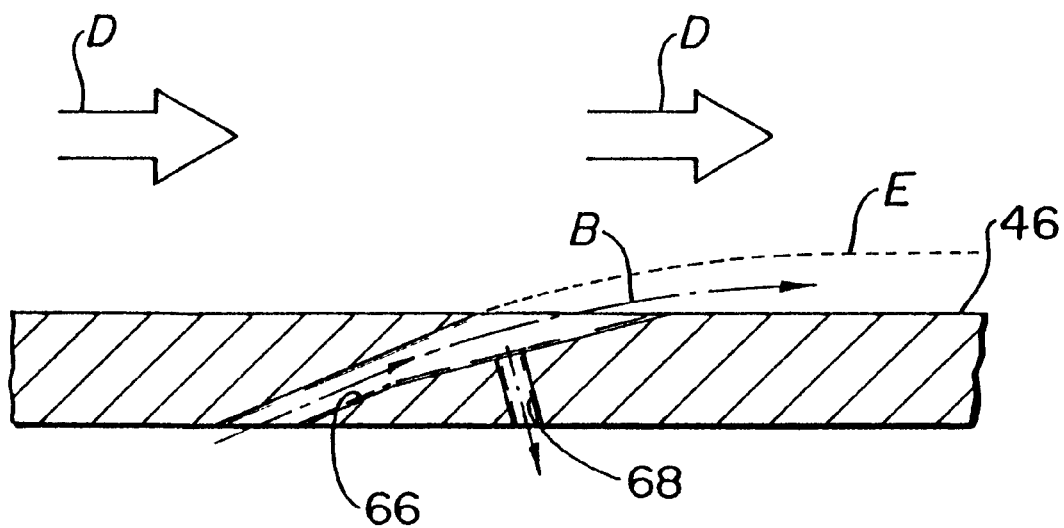

According to this invention the exit end of film cooling hole 66 which is fed with coolant from chamber 60 is in fluid communication with the lower pressure passage 64, immediately downstream from chamber 60 via the passage 68. The lower pressure creates a suction at the exit of film cooling hole 66 which effectively causes the film to adhere to the exterior surface of the pressure side at the trailing edge of the airfoil. Additionally, the injected air from film cooling hole 66 no longer has the propensity to penetrate through the thickness of the boundary layer as has been the case in heretofore known designs. This is schematically illustrated in FIG. 7. As noted therein the exit end of film cooling hole 66 is connected to the suction passage 68 serving to create a suction at this locale. The injected film of coolant aided by this suction has a greater tendency than heretofore known designs to flow along the surface 46 as indicated by arrow B with minimum mixing as depicted by the dash line E.

Figure 4:
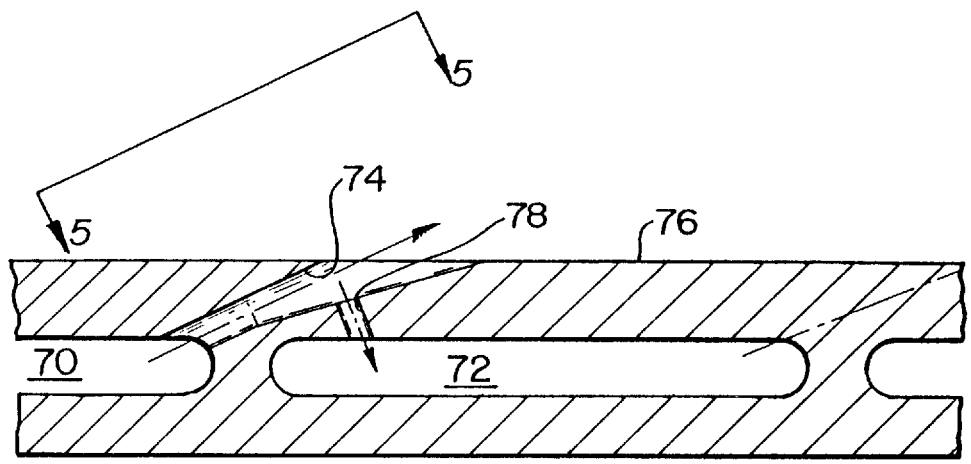
FIG. 4 is a partial view in section illustrating the invention as applied to the suction side of the airfoil.
Figure 5:
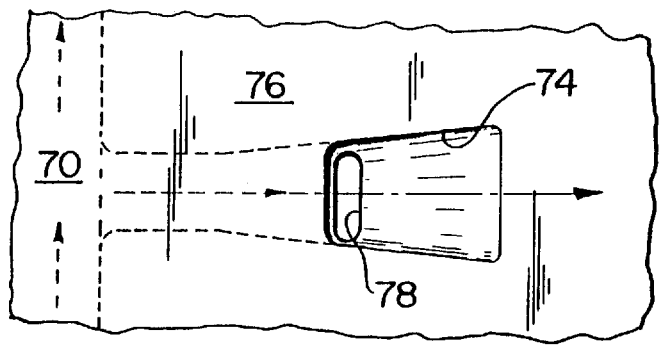
FIG. 5 is a partial top view of the suction surface of the airfoil taken along lines 5—5 depicting the suction aided film cooling hole.

FIGS. 4 and 5 exemplify another section of the airfoil where this invention has utility, namely, the suction side of the airfoil. FIG. 5 is a partial view of the airfoil taken through a section normal to the chordwise section of FIG. 2. In this embodiment the pressure in the radial passages 70 and 72 adjacent to each other are progressively lower, i.e., the pressure in passage 72 is lower than the pressure in passage 70. In this instance the exit end of film cooling hole 74 which is formed in the suction side wall 76 is interconnected to the lower pressure passage 72 via drilled hole 78 for creating a suction at the exit end of the film cooling hole for attaining a more effective film cooling, similar to that shown in the fragmentary view of FIG. 7.

Although this invention has been shown and described with respect to detailed embodiments thereof, it will be appreciated and understood by those skilled in the art that various changes in form and detail thereof may be made without departing from the spirit and scope of the claimed invention.

What is claimed:

1. For an airfoil of a turbine blade for a gas turbine engine being driven by the engine's working gases, said airfoil having internal passages for receiving coolant in the airfoil, said airfoil including pressure wall means for defining a pressure surface, a suction wall means defining a suction surface, a trailing edge formed at the spanwise edge of said pressure wall means and the spanwise edge of said suction wall means, at least one coolant passage for discharging coolant through an opening in said trailing edge, spaced chambers disposed in series in said coolant passage having progressively lower pressures, means for attaining film cooling effectiveness including a film cooling hole through said pressure wall means interconnecting the upstream chamber of said series connected chambers and an interconnecting passage interconnecting the downstream chamber and said film cooling hole of said series connected chambers, whereby the lower pressure in said downstream chamber creates a suction in a film cooling hole for adhering said film of coolant discharging through said cooling hole to minimize boundary layer mixing of said coolant and said gases over the outer surface of said trailing edge.

2. For an airfoil for a turbine blade as claimed in claim 1 wherein said interconnecting passage is disposed at the exit end of said film cooling hole.

3. For an airfoil of a turbine blade for a gas turbine engine being driven by the engine's working gases, said airfoil having internal passages for receiving coolant in the airfoil, wall means defining said airfoil including a suction surface, at least two passageways extending longitudinally in said airfoil for conducting coolant through said airfoil and being in proximity to said suction surface, the pressure of the coolant in one of said passageways being higher than the pressure of the coolant in the other of said passageway, means for attaining film cooling effectiveness including a film cooling hole through said wall means interconnecting said passageway with the higher coolant pressure for leading coolant to said suction side, an interconnecting passage interconnecting said lower coolant pressure passageway and said film cooling hole, whereby the lower pressure in said lower coolant pressure passageway creates a suction in said film cooling hole for adhering a film of coolant discharging through said cooling hole to minimize boundary layer mixing of said coolant and said gases over the outer surface of said suction side.

4. For an airfoil for a turbine blade as claimed in claim 3 wherein said interconnecting passage is disposed at the exit end of said film cooling hole.

5. For an airfoil of a turbine blade for a gas turbine engine driven by the engine's working gases, said airfoil having internal passages for receiving coolant in the airfoil, wall means defining said airfoil, at least two passageways extending longitudinally in said airfoil for conducting coolant through said airfoil and being in proximity to said wall means, the pressure of the coolant in one of said passageways being higher than the pressure of the coolant in the other of said passageways, means for attaining film cooling effectiveness including a film cooling hole through said wall means having an inlet and exit interconnecting said passageway with the higher coolant pressure and the exterior of said airfoil for leading coolant externally of said wall means, an interconnecting passage interconnecting said lower coolant pressure passageway and said film cooling hole in proximity to said exit, whereby the lower pressure in said lower coolant pressure passageway creates a suction in said film cooling hole for adhering a film of coolant discharging through said cooling hole to form a boundary layer over the outer surface of said wall means.

* * * * *